United States Patent

Jang

[11] Patent Number: 6,151,413
[45] Date of Patent: Nov. 21, 2000

[54] METHOD OF CODING AN ARBITRARY SHAPE OF AN OBJECT WHEN ALL PIXELS OF AN ENTIRE REGION OF A DISPLAY ARE USED AS TEXTURE FOR THE OBJECT

[75] Inventor: Euee-seon Jang, Suwon, Rep. of Korea

[73] Assignee: Samsung Electronics Co., Ltd., Suwon, Rep. of Korea

[21] Appl. No.: 09/063,373

[22] Filed: Apr. 21, 1998

[30] Foreign Application Priority Data

Jul. 14, 1997 [KR] Rep. of Korea ................. 97-32626

[51] Int. Cl.[7] .......................... G06K 9/36; G06K 9/48
[52] U.S. Cl. .................. 382/243; 375/240.08; 382/239
[58] Field of Search ........................... 382/232, 236, 382/239, 243; 348/404, 407, 699, 700; 358/430, 433; 345/433; 375/240.08

[56] References Cited

U.S. PATENT DOCUMENTS

| | | | |
|---|---|---|---|
| 5,748,789 | 5/1998 | Lee et al. | 382/243 |
| 5,926,572 | 7/1999 | Kim et al. | 382/238 |
| 5,991,447 | 11/1999 | Eifrig et al. | 382/236 |

FOREIGN PATENT DOCUMENTS

WO 88/09101
A1  11/1988  WIPO .................. H04N 7/13

OTHER PUBLICATIONS

Sikora, The MPEG–4 Video Standard Verification Model, Feb. 1997, p. 19–31, IEEE Transactions on c>>□ cuits and systems for video technology, vol. 7, No. 1.

*Primary Examiner*—Amelia Au
*Assistant Examiner*—Timothy M. Johnson
*Attorney, Agent, or Firm*—Burns, Doane, Swecker & Mathis, L.L.P.

[57] ABSTRACT

A method of coding an object of an arbitrary shape. The arbitrary shape coding method includes the steps of: (a) determining whether or not a shape in a video object layer (VOL) is an arbitrary shape; (b) calculating the size of a video object plane (VOP) in each frame if the shape in the VOL is determined as being an arbitrary shape in the step (a); (c) coding information of each frame about whether or not all macroblocks in the VOP are opaque; (d) coding the VOP in macroblock units if the shape of each frame is determined not to be all opaque in the step (c); and (e) coding only motion and texture information in the VOP, by macroblock, if the shape in the VOL is determined to be a non-arbitrary shape in the step (a) or if the shape in the VOP in a frame is determined as all opaque in step (c). Therefore, when all pixels of the entire display region are used as the texture of the object, the coding of the arbitrary shape can be achieved by coding only 1-bit information per VOP, without the need for transmission of the shape information requiring 1~3 bits per macroblock. Also, the number of modules required for the coding based on a macroblock is reduced from 4 to 2, thereby reducing the amount of calculation for encoding.

5 Claims, 4 Drawing Sheets

METHOD OF CODING AN ARBITRARY SHAPE OF AN OBJECT WHEN ALL PIXELS OF AN ENTIRE REGION OF A DISPLAY ARE USED AS TEXTURE FOR THE OBJECT

This application claims priority under 35 U.S.C. §§119 and/or 365 to 97-32626 filed in Korea on Jul. 14, 1997; the entire content of which is hereby incorporated by reference.

BACKGROUND OF THE INVENTION

1. Field of the Invention

The present invention relates to an object encoding method for an arbitrary shape, and more particularly, to a method of effectively coding an arbitrary shape of an object when all pixels of the entire region of a display are used as a texture of an object.

2. Description of the Related Art

As shown in FIG. 1, an object having an arbitrary shape is generally classified as having a shape and a texture.

A conventional arbitrary shape coding method, e.g., described in the MPEG-4 Video VM (Version 7.0), is performed by the steps shown in FIG. 2.

First, it is determined whether or not the shape in a video object layer (VOL) is an arbitrary shape (step 110).

If the shape in the VOL is an arbitrary shape, the size of the object (width, height, etc.) is calculated for each frame which is a video object plane (VOP) (step 120), and then coding of motion, shape and texture of each block is performed (step 140).

On the other hand, if the shape in the VOL is not an arbitrary shape, a rectangular frame is previously determined, so that coding of only motion and texture is performed by macroblock (step 150).

As shown in a time frame t+3 of FIG. 3, all pixels of the entire region of a screen may be used as the texture of an object having an arbitrary shape, in certain screens. When performing shape coding using the conventional method shown in FIG. 2, shape information on each macroblock constituting the screen must be included in a transmission data stream, even when the entire screen is occupied by only the texture of the object having an arbitrary shape.

When the texture of the object occupies the entire of screen, the shape information by macroblock is useless. Thus, it is ineffective to include such useless information in the transmission data, because the shape information requires extra time for computation.

SUMMARY OF THE INVENTION

To solve the above problems, it is an objective of the present invention to provide a method of effectively coding an object having an arbitrary shape when all pixels of the entire screen are used as the texture of the object.

To achieve the above objective, there is provided an arbitrary shape coding method comprising the steps of: (a) determining whether or not a shape in a video object layer (VOL) is an arbitrary shape; (b) calculating the size of a video object plane (VOP) in each frame if the shape in the VOL is determined as being an arbitrary shape in the step (a); (c) coding information of each frame about whether or not all macroblocks in the VOP are opaque; (d) coding the VOP in macroblock units if the shape of each frame is determined not to be all opaque in the step (c); and (e) coding only motion and texture information in the VOP, by macroblock, if the shape in the VOL is determined to be a non-arbitrary shape in the step (a) or if the shape in the VOP in a frame is determined as all opaque in step (c).

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

In the following embodiment, a video object layer (VOL) designates an entire object belonging to an image frame for a predetermined duration when an object moves along a time axis, and a video object plane (VOP) designates one still screen processed at a given moment. Thus, the VOL includes the VOPs of every moment for a predetermined duration.

The width and height of the VOL are the same as the size of a display in a TV receiver or PC monitor.

When the object of the VOL to be coded is an arbitrary shape, the minimum rectangular region enclosing the arbitrary shape becomes the VOP. Thus, the width and height of the VOP are different in every frame. If the object to be coded of the VOL is rectangular, the size of the VOP is fixed to the width and height designated in the VOL.

Figure 3:
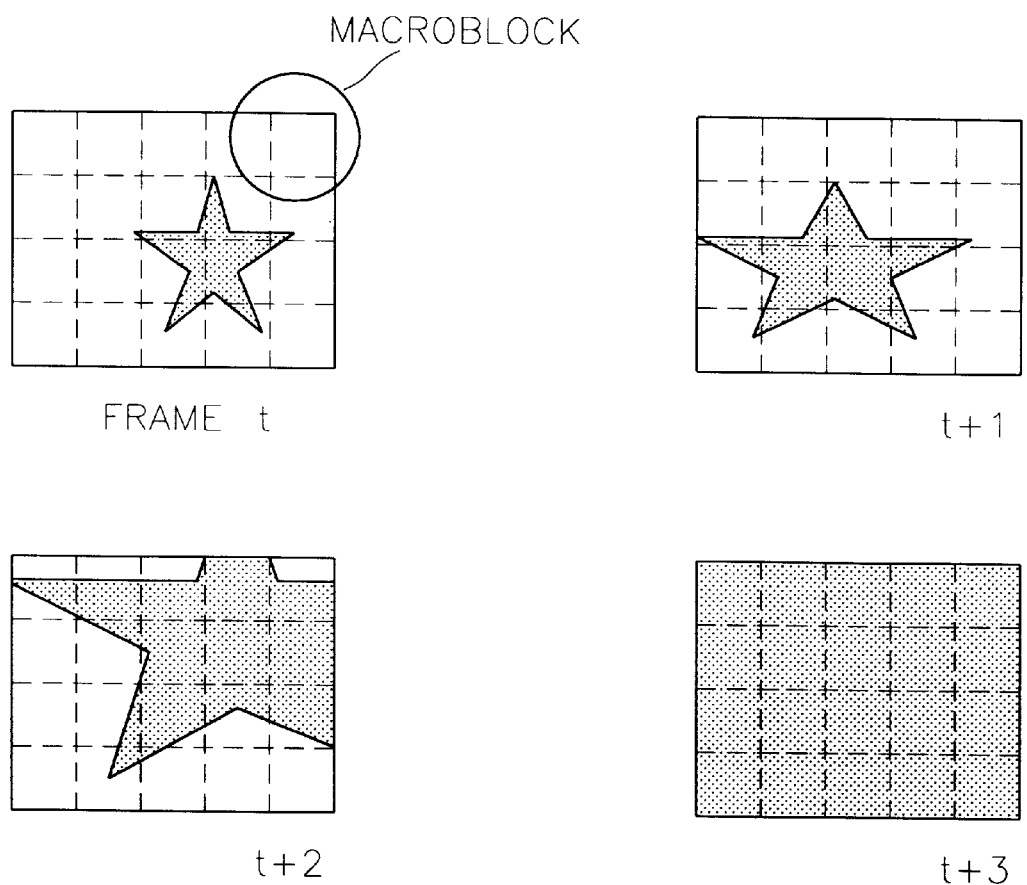
FIG. 3 is a diagram showing objects having an arbitrary shape by time frame.

Thus, the widths and heights of the four frames shown in FIG. 3 are the same as those of the VOL, and the widths and heights of rectangles forming the minimum regions enclosing the star-shaped objects of the rectangular frames are the same as those of the VOP.

Figure 4:
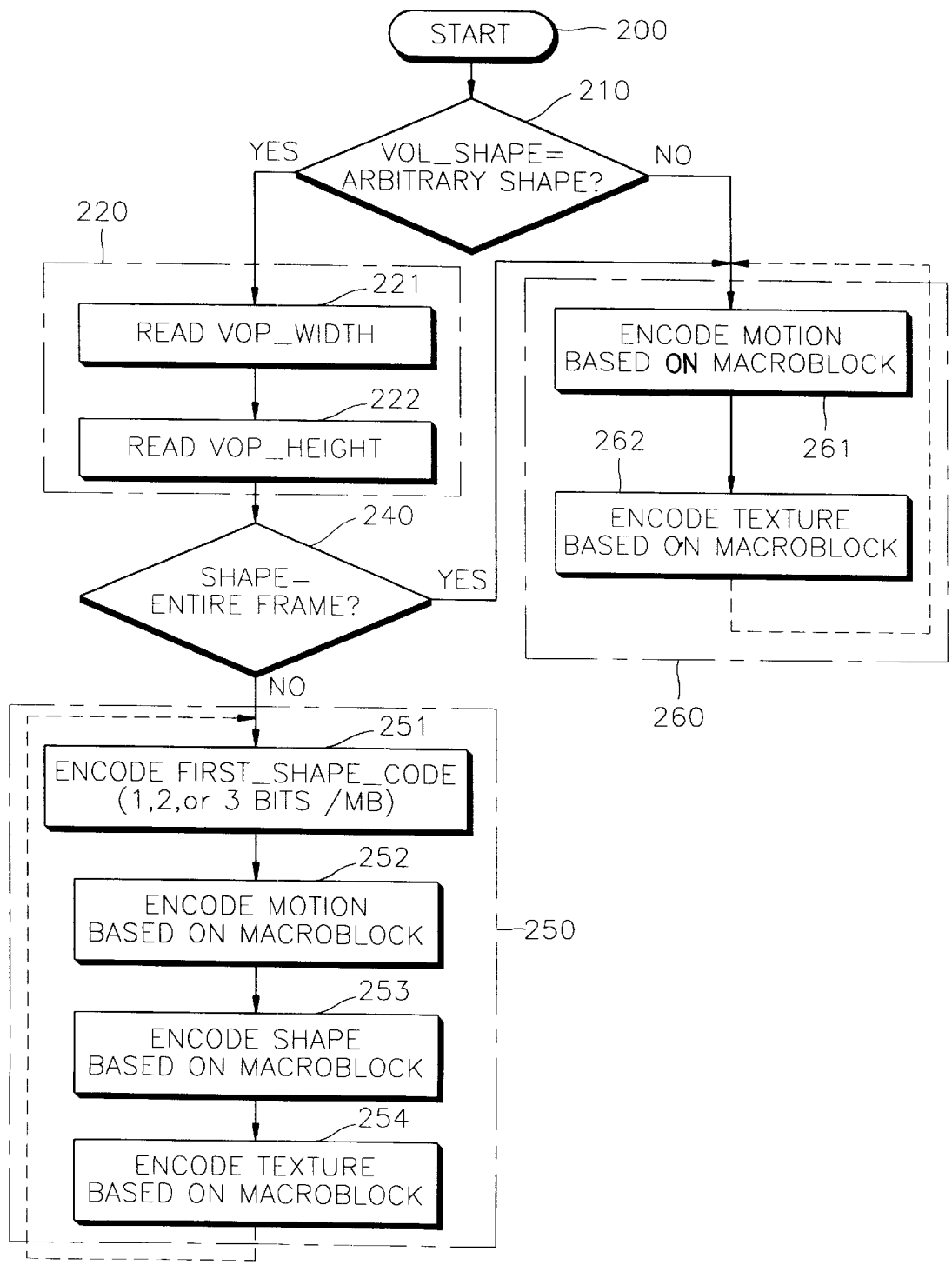
FIG. 4 is a flowchart illustrating an arbitrary shape coding method according to the present invention.

Referring to FIG. 4, an arbitrary shape coding method according to the present invention includes the steps of: determining whether or not the shape of the VOL (VOL__shape) is an arbitrary shape (step 210); calculating the size of the VOP of each frame (step 220), coding information about whether or not all macroblocks of each frame are opaque (step 240), coding the VOP by macroblock if not all macroblocks of the screen are opaque (step 250); and coding only motion and texture information of the VOP by macroblock if the shape of the VOL is not an arbitrary shape or if all macroblocks in the VOP of the frame are opaque (step 260).

The shape of the object in the VOL is classified as either an arbitrary shape or a non-arbitrary shape. Here, the arbitrary shape has any shape, and the non-arbitrary shape designates a rectangular region regarded as one shape. In step 210, it is determined whether or not the shape of the object in the VOL is an arbitrary shape.

In step 220, if the shape of the object in the VOL is an arbitrary shape, then the width of the VOP of each time frame is calculated (step 221) and the height of the VOP is calculated (step 222).

In step 240, it is determined in frame units whether or not the shape occupies the entire of display, that is, whether or not all macroblocks in the VOP are opaque, and then such information is coded.

Here, in order to make such determination, a target frame is compared with a reference shape which is all opaque. Then, if there is no difference in the comparison, the target frame is determined as being all opaque.

In this embodiment, the determination of whether or not the shape is all opaque is made in step 240. However, only when the width and height of the VOP calculated in step 220 are the same as those of the VOL, when the width and height of the VOP are the same as those of the frame, when the width and height of the VOP are the same as those of the VOP in the previous frame, or when the above conditions are appropriately combined, can such determination of whether or not the shape is all opaque be made, thereby reducing the number of determinations.

In step 250, if the shape is not all opaque, the shape information in a macroblock is coded (step 251), motion is coded by macroblock (step 252), shape is coded by macroblock (step 253) and texture is coded by macroblock (step 254).

The shape information in a macroblock unit is distributed in one of transparent, opaque and boundary regions. The transparent region represents the macroblocks without shape information, and the opaque region represents the case where all pixels within the macroblock are the shape information of the object. The boundary region represents the macroblock of which some of the pixels have shape information of the object while the remaining pixels have no shape information. In the first shape encoding step by macroblock (step 251), the type information of the macroblocks is coded so as to exclude the transparent or opaque macroblocks from the coding.

In step 260, if the shape in the VOL is not an arbitrary shape or the shape in the VOP is all opaque, motion encoding by macroblock (step 261) and texture encoding by macroblock (step 262) are performed.

Thus, according to the present invention, if the shape in the VOP is all opaque, the above first shape encoding by macroblock (step 251) is not necessary. Thus, the encoding step requiring 1~3 bits is replaced by a 1-bit coding in VOP units.

According to the arbitrary shape coding method of the present invention, if all pixels of the entire display region are used as the texture of the object, the coding of the arbitrary shape can be achieved by coding only 1-bit information per VOP, without the need for transmission of the shape information requiring 1~3 bits per macroblock.

Also, if the shape of the VOP is all opaque, the number of modules required for the coding based on a macroblock is reduced from 4 to 2, thereby reducing the amount of calculation for encoding.

In order to evaluate the performance of the present invention, the amount of shape coding in the present invention when the shape in the VOP is all opaque is compared with that of the conventional method, and the results are tabulated in Table 1.

TABLE 1

| VOP size | present invention | conventional method |
| --- | --- | --- |
| CCIR 601 (720 × 480) | 1 (Flag) bit | 1530 (MB number) * 2 bits (average information amount) = 2,700 bits |
| CIF (352 × 288) | 1 (Flag) bit | 396 * 2 bits = 792 bits |
| QCIF (176 × 144) | 1 (Flag) bit | 99 * 2 bits = 198 bits |

TABLE 1-continued

| VOP size | present invention | conventional method |
| --- | --- | --- |
| Random (2048 × 2048) | 1 (Flag) bit | 16384 * 2 bits = 32,768 bits |

Figure 1:
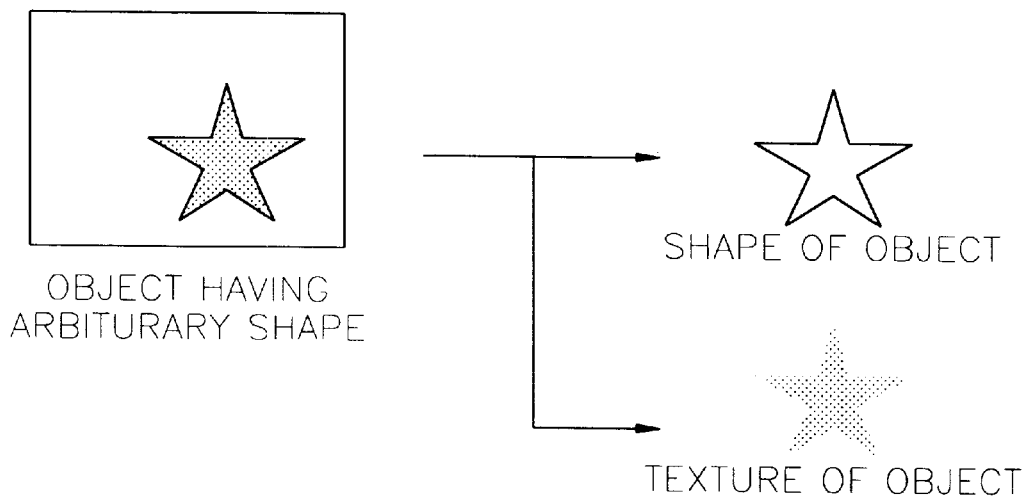
FIG. 1 is a diagram showing the components of an object having an arbitrary shape.
Figure 2:
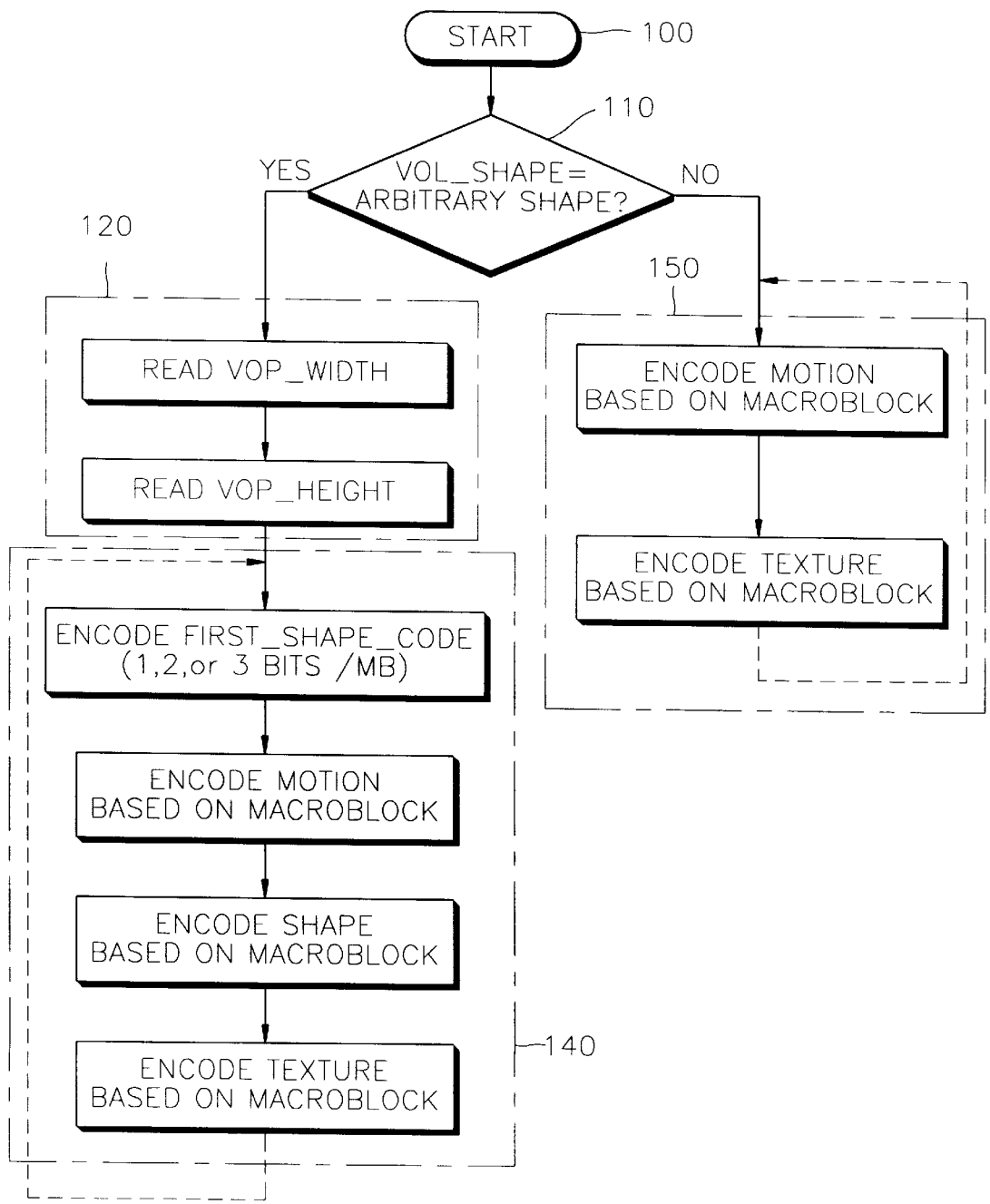
FIG. 2 is a flowchart illustrating a conventional method of coding an object having an arbitrary shape.

As shown in FIG. 1, the amount of shape coding in the conventional method is twice the number of macroblocks in the VOP, while the amount of shape coding in the present invention is 1 bit per VOP.

What is claimed is:

1. An arbitrary shape coding method comprising the steps of:

(a) determining whether or not a shape in a video object layer (VOL) is an arbitrary shape;

(b) calculating the size of a video object plane (VOP) in each frame if the shape in the VOL is determined as being an arbitrary shape in the step (a);

(c) coding information of each frame about whether or not all macroblocks in the VOP are opaque;

(d) coding the VOP in macroblock units if the shape of each frame is determined not to be all opaque in the step (c); and (e) coding only motion and texture information in the VOP, by macroblock in two circumstances of (1) if the shape in the VOL is determined to be a non-arbitrary shape in the step (a) and if (2) the shape in the VOP in a frame is determined as all opaque in step (c).

2. The arbitrary shape coding method of claim 1, wherein the step (b) comprises the sub-steps of:

calculating the width of the VOP in each frame; and calculating the height of the VOP in each frame, wherein the determination of whether or not the shape is all opaque is made only when the width and height of the VOP are the same as those of the VOL.

3. The arbitrary shape coding method of claim 1, wherein the step (b) comprises the sub-steps of:

calculating the width of the VOP in each frame; and calculating the height of the VOP in each frame, wherein the determination of whether or not the shape is all opaque is made only when the width and height of the VOP are the same as those of the corresponding frame.

4. The arbitrary shape coding method of claim 1, wherein the step (b) comprises the sub-steps of:

calculating the width of the VOP in each frame; and calculating the height of the VOP in each frame, wherein the determination of whether or not the shape is all opaque is made only when the width and height of the VOP are the same as those of the VOP in the previous frame.

5. The arbitrary shape coding method of claim 4, wherein the step (c) comprises the sub-steps of:

coding information of each frame whether the shape of the current VOP is the same as the previous VOP; and coding only motion and texture information using the shape information if the shape of the VOP is determined to be the same as that of the previous VOP.

* * * * *